(12) United States Patent
Gonzalez et al.

(10) Patent No.: US 9,210,993 B2
(45) Date of Patent: Dec. 15, 2015

(54) BRUSH WITH REPLACEABLE TWISTED-IN-WIRE BRISTLE ASSEMBLY

(71) Applicants: Mario M. Gonzalez, Kenosha, WI (US); Marilyn Bowden, Chicago, IL (US); Gregory J. Foster, Chicago, IL (US)

(72) Inventors: Mario M. Gonzalez, Kenosha, WI (US); Marilyn Bowden, Chicago, IL (US); Gregory J. Foster, Chicago, IL (US)

(73) Assignee: Weber-Stephen Products LLC, Palatine, IL (US)

( * ) Notice: Subject to any disclaimer, the term of this patent is extended or adjusted under 35 U.S.C. 154(b) by 113 days.

(21) Appl. No.: 13/890,847

(22) Filed: May 9, 2013

(65) Prior Publication Data
US 2014/0331424 A1  Nov. 13, 2014

(51) Int. Cl.
| | | |
|---|---|---|
| *A47L 13/08* | (2006.01) |
| *A46B 3/18* | (2006.01) |
| *A47L 13/06* | (2006.01) |
| *A46B 7/04* | (2006.01) |
| *A47J 37/07* | (2006.01) |

(52) U.S. Cl.
CPC ... *A46B 3/18* (2013.01); *A46B 7/04* (2013.01); *A47L 13/06* (2013.01); *A46B 7/042* (2013.01); *A46B 2200/3033* (2013.01); *A47J 37/0786* (2013.01)

(58) Field of Classification Search
CPC .................. A46B 15/0081; A46B 2200/3093; A46B 7/042; A46B 9/02; A46B 3/18; A47J 37/0786

USPC ............................................. 15/111, 160, 206
See application file for complete search history.

(56) References Cited

U.S. PATENT DOCUMENTS

| 714,215 | A | * | 11/1902 | Martin | 15/111 |
|---|---|---|---|---|---|
| 1,569,431 | A | * | 1/1926 | Lucia | 15/104.5 |
| 1,921,002 | A | * | 8/1933 | Ozabal | 15/104.5 |
| 2,123,044 | A | * | 7/1938 | Hertzberg | 15/206 |
| 2,306,051 | A | * | 12/1942 | Max | 15/176.5 |
| 2,691,182 | A | * | 10/1954 | Baize | 15/27 |
| 5,643,403 | A | * | 7/1997 | Poole et al. | 156/762 |
| 6,966,094 | B1 | * | 11/2005 | Rigakos | 15/111 |
| 7,039,983 | B1 | | 5/2006 | Outlaw | |
| 7,103,936 | B1 | * | 9/2006 | Brandon | 15/236.06 |
| D601,345 | S | | 10/2009 | Wales | |
| 8,032,974 | B2 | * | 10/2011 | Carpenter | 15/229.11 |
| 8,209,812 | B1 | * | 7/2012 | Dondurur et al. | 15/229.11 |
| 8,615,838 | B1 | * | 12/2013 | Lu | 15/111 |
| 8,806,698 | B2 | * | 8/2014 | Enders et al. | 15/248.1 |
| 2005/0011029 | A1 | * | 1/2005 | Yu | 15/111 |
| 2006/0080797 | A1 | * | 4/2006 | Yu | 15/176.4 |
| 2006/0207042 | A1 | * | 9/2006 | Di Paolo | 15/111 |
| 2012/0023689 | A1 | * | 2/2012 | Weinberger et al. | 15/111 |

OTHER PUBLICATIONS

Twisted-in-wire brush from Rosle, www.rosleusa.com (see attached).
Twisted-in-wire materials from Carolina Brush, www.carolinabrush.com (see attached).

* cited by examiner

*Primary Examiner* — Monica Carter
*Assistant Examiner* — Michael Jennings
(74) *Attorney, Agent, or Firm* — Niro Haller & Niro

(57) ABSTRACT

A brush for cleaning a grill or other surface having a bristle assembly of twisted-in-wire material that is removable and replaceable.

4 Claims, 4 Drawing Sheets

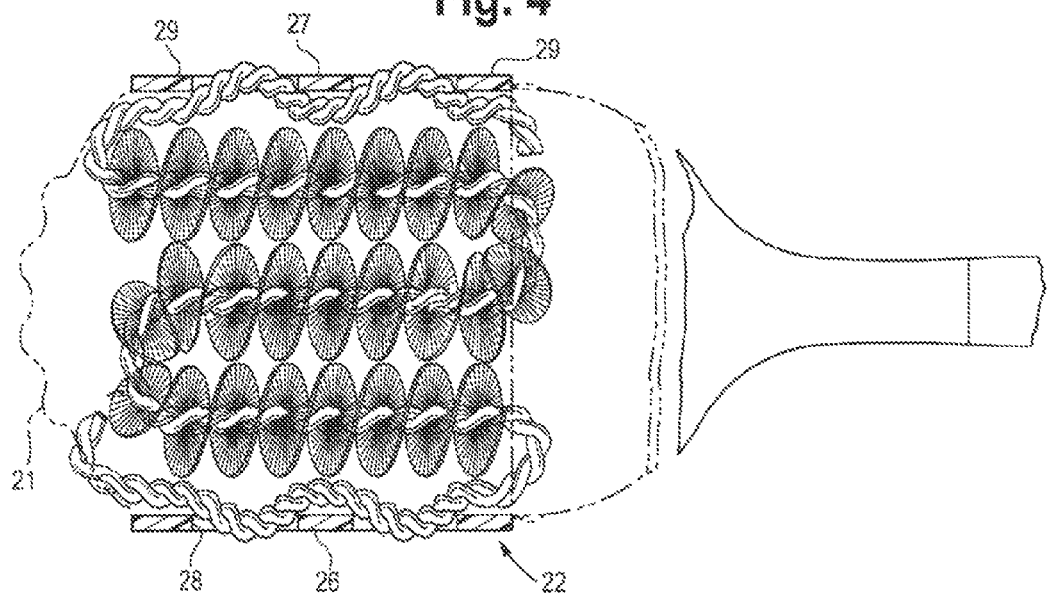
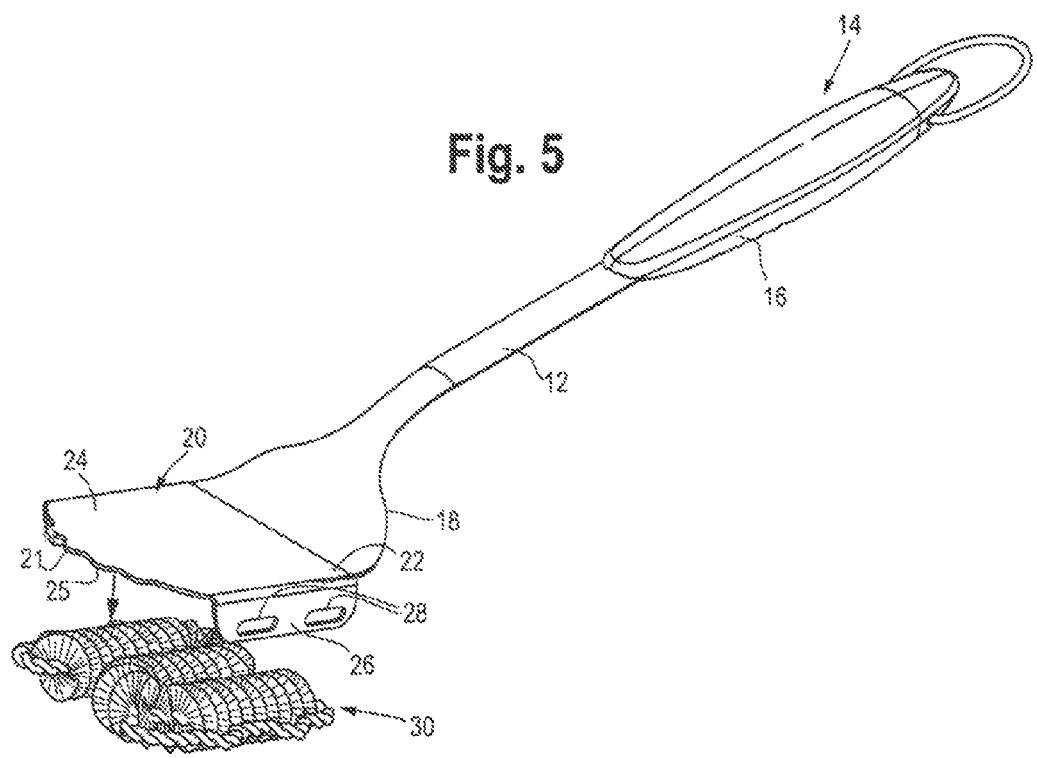

BRUSH WITH REPLACEABLE TWISTED-IN-WIRE BRISTLE ASSEMBLY

FIELD OF THE INVENTION

The present inventions relate generally to brushes, especially those used to clean barbecue grills and the like. More particularly, the present inventions relate to brushes having removable and replaceable twisted-in-wire bristle assemblies.

BACKGROUND OF THE INVENTION

Brushes and other implements to clean grill grates, griddles and other similar surfaces are well known. Such implements typically include a handle terminating in a head portion that supports bristles, pads and/or scrapers. A well known type of brush typically used on grills includes a head portion with clusters of wire bristles protruding from holes in the brush head (see e.g., U.S. Pat. No. 7,039,983). After a period of use, the bristles or pads become worn, broken and less effective. When this occurs, the entire brush is discarded and replaced. This results in, among other things, increased use of materials and additional expense.

There are some brushes available that have a removable and replaceable head or bristle assembly. However, many of these brushes do not have removable and replaceable heads that use twisted-in-wire material. Moreover, those brushes that do have twisted-in-wire bristle assemblies that are replaceable, typically have complex hinge type arrangements to secure the brushes which are difficult to clean and are prone to failure (see e.g., U.S. Design Pat. No. D601,345). The hinge is configured to rotate the curved handle with respect to the straight handle to fold the first end of the curved handle against the straight handle for storage or to fold the first end of the curved handle away from the straight handle for cleaning the barbecue grill cooking surface. Others, such as those available from Rösle (rosleusa.com) appear to have complex frame arrangements on the head top removably secure the twisted-in-wire bristles. Moreover, in these brushes, the bristle assembly is made from separate pieces of twisted-in-wire material that is attached to the front and back portion of the head in a bracket structure. As a result, the replacement bristles are difficult to install and brackets make the brush more difficult to clean and use.

Accordingly, there is a need to provide an improved brush having a removable and replaceable bristle assembly, particularly a bristles assembly having, twisted-in-wire bristles that is easy to replace.

SUMMARY OF THE INVENTION

The present inventions preserve the advantages of known brushes and also provide new features, advantages and results.

Therefore, it is an object of the present invention to provide a brush having removable and replaceable bristle assembly having twisted-in-wire bristles.

It is another object of the present invention to provide to brush having a bristle assembly that is easy to remove and replace.

It is an additional object of the present invention to provide a brush with a removable and replaceable bristle assembly having twisted-in-wire bristles that does not require complex brackets, binges or fasteners to secure the bristle assembly to the head.

It is still another object of the present invention to provide a brush with a removable and replaceable bristle assembly having twisted-in-wire bristles that is efficiently manufactured, it is a further object of the present invention to provide a grill brush with a removable and replaceable bristle assembly having twisted-in-wire bristles wherein the brush includes a scraper.

It is still a farther object of the present invention to provide a grill brush with a removable and replaceable bristle assembly having twisted-in-wire bristles that is easy to clean and use, and can be used with a variety of different handles and head shapes.

Accordingly, a brush for cleaning a grill or other surface is provided having a handle with a gripping end and a forward end; a head portion extending from the forward end, the head portion having a front edge, two sides, a bottom surface and a top surface, wherein each of the two sides ides a flange projecting below the bottom surface of the head portion, and each flange having at least one aperture; and a bristle assembly of twisted-in wire material having a bristle portion and two stem portions, wherein each stem portion includes at least one protrusion capable of removable engagement with the apertures on the flanges. Preferably, the bristle assembly has a sinuous geometry between each of the stem portions, each stem portion being parallel and adjacent to each of the flanges. The bristle assembly may include three rows of twisted-in-wire bristles between each stem end. The bristle portion may further include at least one row of twisted-in wire material that is parallel to the two stem portions. Alternatively, the bristle portion may include at least one row of twisted-in wire material that is perpendicular to the two stem portions.

Also in accordance with the objects of the inventions, a brush for cleaning a grill or other surface is providing having a handle with a gripping end and a forward end; a head portion extending from the forward end, the head portion having a front edge, a top surface, a bottom surface and two sides, wherein each side includes a flange projecting below the bottom portion, each flange including at least one aperture and at least one notch; a bristle assembly of twisted-in-wire material having a first stem portion, a plurality of bristle portions and a plurality of intermediate stem portions alternating with bristle portions, wherein the first stem portion is received in the apertures on the flanges and the intermediate stem portions are received and engaged by notches on the flanges. The bristle assembly may have sinuous geometry and at least one bristle portion may be aligned parallel to the first stem portion. Alternatively, at least one bristle portion may be aligned perpendicular to the first stem portion.

Further in accordance with the present inventions, another embodiment provides a grill brush having a handle portion and a head portion having two sides and a downwardly projecting flange member associated with each of the two sides; a bristle assembly of twisted-in-wire bristle material, the bristle material having a plurality of stem portions and at least one bristle portion, the plurality of stem portions including protrusions or engagement members; and at least one aperture or receiving means on each of the flanges for engaging the protrusions or engagement members.

A bristle assembly for cleaning a grill or other surface is bother provided which includes at least one bristle portion; a first stem portion having a first engagement member; and a second stem portion having a second engagement member, wherein the first engagement member and the second engagement member are configured to interface with a corresponding receiving member for securing the bristle assembly to a head portion of a brush. The bristle assembly may consist of twisted-in-wire material.

INVENTOR'S DEFINITION OF THE TERMS

The terms used in the claims of this patent are intended to have their broadest meaning consistent with the requirements of law. Where alternative meanings are possible, the broadest meaning is intended. All words used in the claims are intended to be used in the normal, customary usage of grammar and the English language.

BRIEF DESCRIPTION OF THE DRAWINGS

The stated and unstated objects, features and advantages of the present inventions (sometimes used in the singular, but not excluding the plural) will become apparent from the following descriptions and drawings, wherein like reference numerals represent like elements in the various views, and in which:

FIG. 4 is a bottom plan view of a head of the preferred brush showing the preferred bristle assembly having twisted-in-wire bristles installed on the head portion;

FIG. 5 is an isometric view of the preferred embodiment of FIG. 1 with the preferred bristle assembly removed from the head portion;

DETAILED DESCRIPTION OF PREFERRED EMBODIMENTS

Set forth below is a description of what is currently believed to be the preferred embodiments or best representative examples of the inventions claimed. Future and present alternatives and modifications to the embodiments and preferred embodiments are contemplated. Any alternatives or modifications which make insubstantial changes in function, purpose, structure or result are intended to be covered by the claims of this patent.

Figure 1:
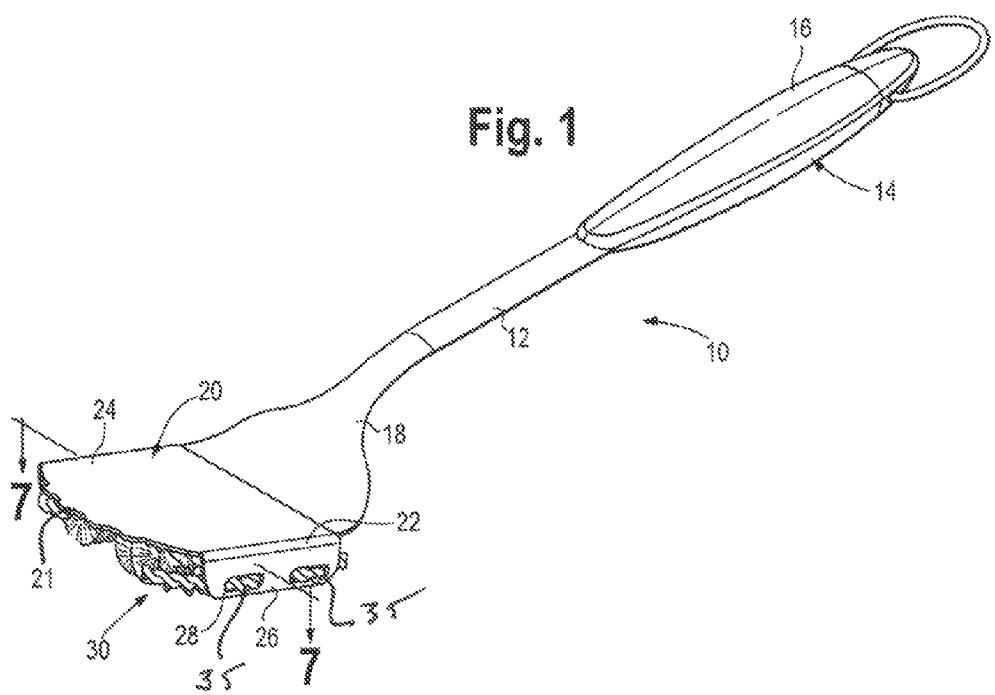
FIG. 1 is an isometric view of a preferred embodiment of the brush of the present inventions having a preferred removable and replaceable bristle assembly.
Figure 2:
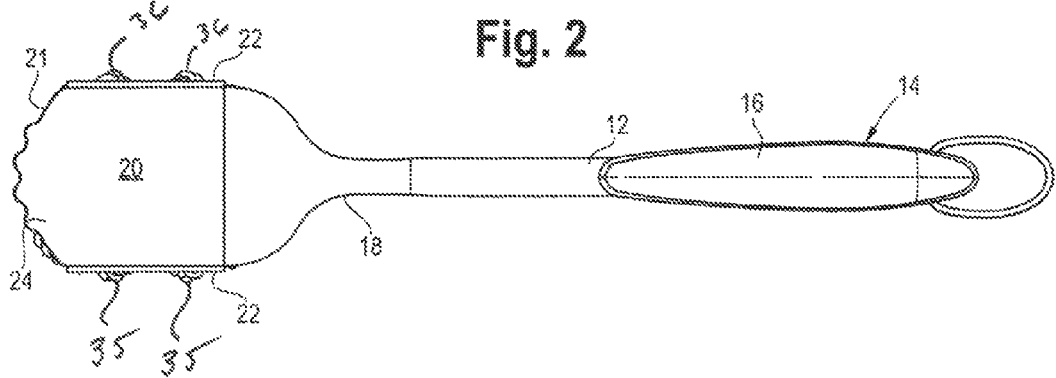
FIG. 2 is a top plan view of the preferred embodiment of the brush in FIG. 1.
Figure 3:
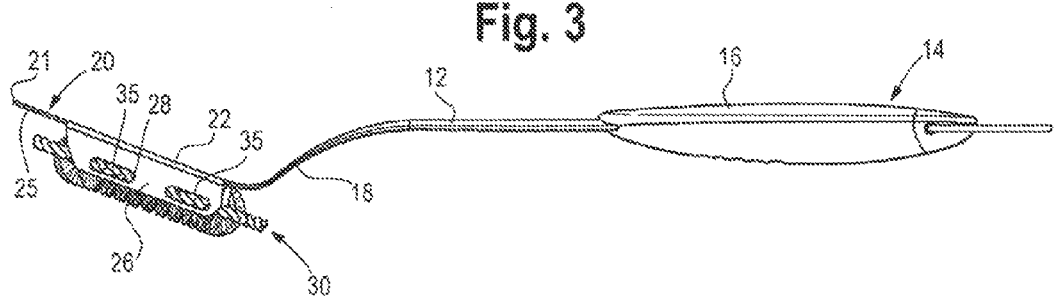
FIG. 3 is a side plan view of the preferred embodiment of the brush in FIG. 1.

The major components of a preferred embodiment of a brush 10 having a removable and replaceable bristle assembly 30 of the present invention may be seen by reference to FIGS. 1, 2 and 3. Brush 10 includes a handle 12 having a gripping end 14 that may include an optional grip 16 as show in the Figures. Handle 12 has a forward end 18 that terminates in a head portion 20. It will be understood that handle 13 may be a unitary construction or may include one or more separate components such as the grip end 14, forward end 18 and/or head portion 20. A bristle assembly 30 is also provided, which is removably secured to head portion 20 as hereinafter described.

As shown in FIGS. 1, 3, 4 and 5, preferred head portion 20 includes a front edge 21, two sides 22, 23, a top surface 24 and a bottom surface 25 (see FIG. 4). Preferably, front edge 21 incorporates a scraper as shown. Alternatively, a separate scraping member may be attached to head 20 (not shown). Side 22 terminates in or includes a side flange 26 and side 23 terminates in or includes a side flange 27. Side flange 26 includes one or more apertures, notches or other receiving means 28 and side flange 27 includes one or more apertures, notches or other receiving means 29. It will be understood by those of skill in the art that the flanges 26 and 27 may be formed as part of or may otherwise be attached to sides 22 and 23 of head portion 20.

Figure 6:
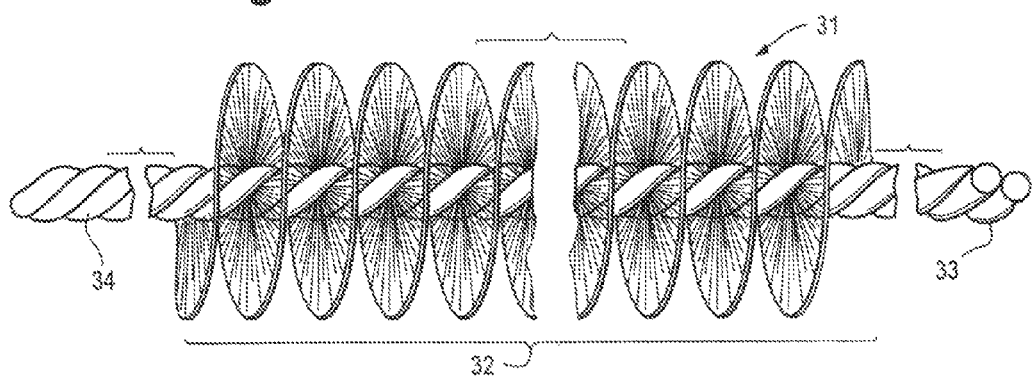
FIG. 6 is an isometric view of twisted-in-wire material with a bristle portion and stem portions shown prior to formation into a bristle assembly.

Preferred bristle assembly 30 may best be seen by reference to FIGS. 4, 5, 6 and 7. Preferred bristle assembly 30 is formed from a single piece of twisted-in-wire material 31 having a bristle portion 32 between a first stem portion 33 and a second stem portion 34 (FIG. 6). Those of skill in the art will understand that twisted-in-wire materials are available from a variety of sources, for example Carolina Brush (www.carolinabrush.com). The embodiment 31 shown is constructed from double twisted wire, but other forms are available consistent with the present inventions. In addition, metal wire bristles of bristle portion 32 are preferred. However, other materials may be used, including nylon, plastic and the like. Similarly, stem portions 33 and 34 are preferably a metal wire material, but other non-metallic material may also be used.

Figure 7:
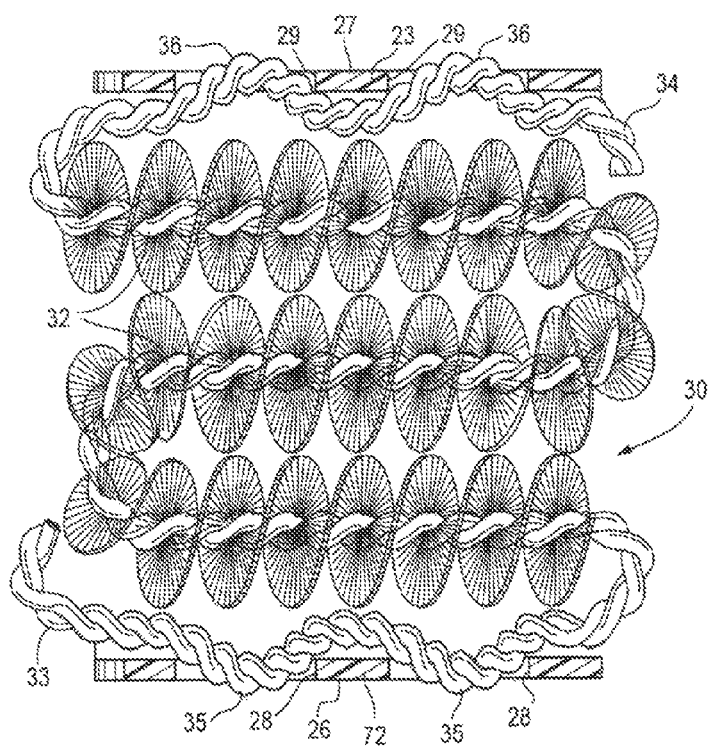
FIG. 7 is a top sectional view taken along line 7-7 of FIG. 1 showing the preferred bristle assembly engaged in the head portion, of the preferred brush.

As best shown in FIGS. 4 and 7, twisted-in-wire material 31 is formed into a sinuous or serpentine shape for preferred bristle assembly 30. First stem portion 33 is shaped to be adjacent and parallel to flange 22 and is provided with two protrusions 35 or other engagement elements. Similarly, second stem portion 34 is also shaped to be adjacent to flange 23 and is also provided with two protrusions 36 or other engagement elements. Bristle portion 3 is then bent, twisted or otherwise formed to have rows 37 that are generally parallel to each other and to stem portions 33 and 34. Although the rows 37 are preferably parallel to stem portions 33 and 34, it is understood that the rows 37 could alternatively be perpendicular to the stem portions 33 and 34. Preferred protrusions 35 are designed to be received or secured in apertures 28 and protrusions 36 are designed to be received or secured in apertures 29. Because twisted-in-wire material 31 is flexible, the bristle assembly 30 and protrusions 35 and 36 are tensioned to be securely engaged in apertures 28 and 29 so that the bristle assembly 30 may be used to clean the selected surface. When it is desired to disengage the bristle assembly 30 from the head portion 20, stem portions 33 and 34 are compressed and bristle assembly 30 may be removed for replacement and/or cleaning. By extension, stem portions 33 and 34 may be compressed by applying force to protrusions 35 and 36.

It will be understood by those of skill in the art that bristle assembly 30 may take other forms. For example, if twist-in-wire material is of a sufficiently small diameter, more than three parallel rows of bristles 37 may be present. If larger diameter material 31 is used, fewer rows of bristles 37 may be provided. The number of rows of bristles 37 may also vary depending on the spacing between flanges 26 and 27. In addition, two protrusions 35 and 36 are preferably formed from first and second stem portions 33 and 34. However, more or less than two protrusions 35 and 36, or different shaped protrusions 35 and 36, may also be used. In addition, protrusions 35 and 36 may be separate from and attached to the first and second stem portions 33 and 34, rather than formed therefrom. For example, engagement members received by apertures 28 and 29 may be attached, welded or otherwise fastened to first and second stem portions 33 and 34, such that they are received and secured by aperture 28 and 29. First and second stem portions may also be crimped to form protrusions 35 and 36.

It will also be understood that the receiving means or apertures 28 and 29 may take a variety of forms. For example, they can be slot shaped apertures 28 and 29 in the flanges 26 and 27 as shown in FIGS. 1, 3 and 5. They may also be cut-outs or notches or a combination thereof as hereinafter described. An example of such an additional engagement member or aperture 28 and 29 is shown in the alternative embodiment of FIGS. 8 and 9.

Figure 8:
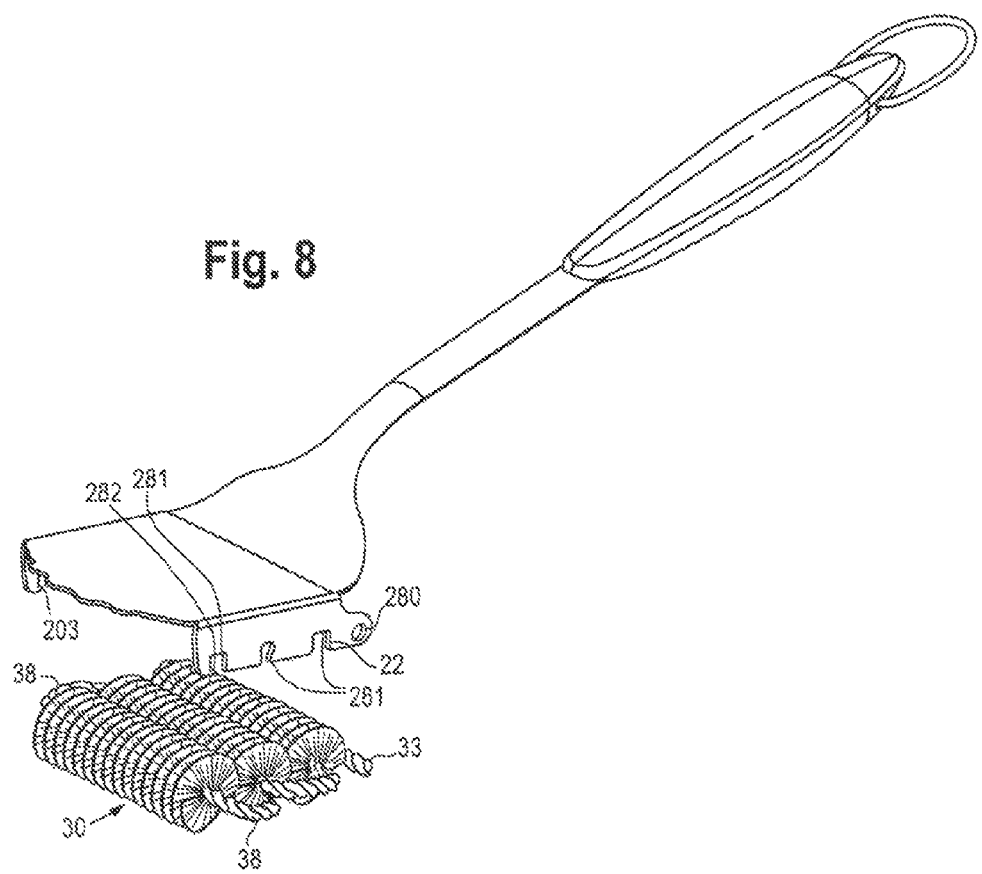
FIG. 8 is an isometric view of an alternative embodiment of the present inventions showing an alternative bristle assembly and corresponding receiving means on the head portion.
Figure 9:
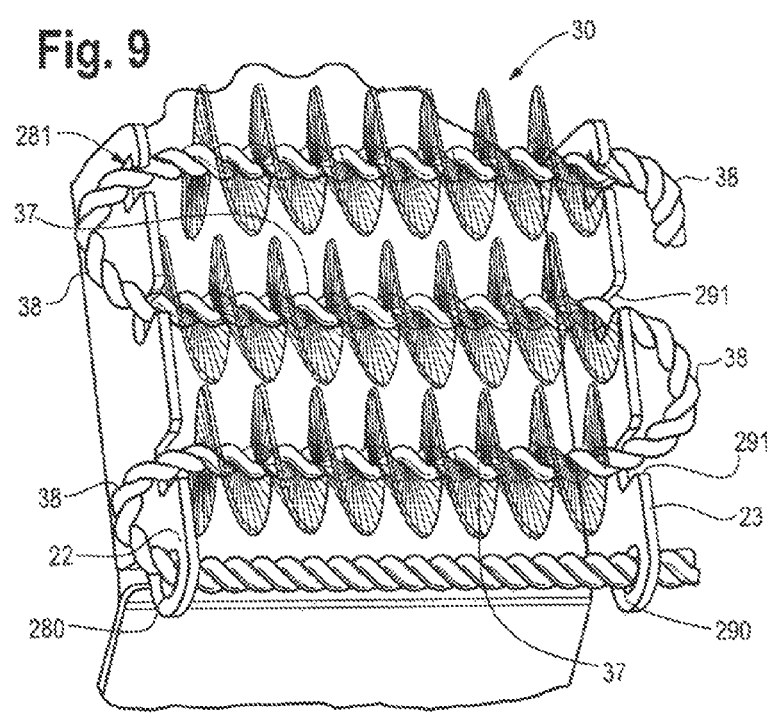
FIG. 9 is a bottom plan view of a head of the alternative brush showing an alternative embodiment of the twisted-in-wire bristle assembly installed on the head.

An alternative embodiment of the present invention may be seen by reference to FIGS. 8 and 9. In the alternative embodiment, side flanges 26 and 27 of head portion 20 include a receiving means, namely a hole or circular aperture 280 and 290 and a series of notches 281 and 291 (see FIGS. 8 and 9). In this embodiment, bristle assembly 30 is formed from twisted material 31 having only a first stem portion 33 and a bristle portion 32. The bristle portion 32 is not continuous as in a preferred embodiment, but includes intermediate stem portions 38. The twisted-in-wire material is formed into a sinuous or serpentine path with a series of parallel rows 37. Stem portion 33 is also parallel to rows 37. In this embodiment, intermediate stem portions 38 form the engagement members 35 and 36. A hinge is configured to rotate the curved handle with respect to the straight handle to fold the first end of the curved handle against the straight handle for storage or to fold the first end of the curved handle away from the straight handle for cleaning the barbecue grill cooking surface.

To install bristle assembly 30 in this embodiment, first stem portion 33 is inserted into hole 280 of side flange 22 and extends through hole 290 of side flange 23. The intermediate stem members are then inserted into notches 281 and 291 of side flanges 26 and 27 and locked into place with prong 282 and 283. In this embodiment, the parallel rows of bristles 37 are perpendicular to the longitudinal axis of head portion 20 and handle 12. Other configurations of receiving means 28 and 29 and engagement members 35 and 36 of twisted-in-wire material 31 forming bristle assembly 30 are also contemplated consistent with the present inventions.

The above description is not intended to limit the meaning of the words used in or the scope of the following claims that define the invention. Rather, it is contemplated that future modifications in structure, function or result will exist that are not substantial changes and that all such insubstantial changes in what is claimed are intended to be covered by the claims. Thus, while preferred embodiments of the present inventions have been illustrated and described, it will be understood that changes and modifications can be made without departing from the claimed invention. In addition, although the term "claimed invention" or "present invention" is sometimes used herein in the singular, it will be understood that there are a plurality of inventions as described and claimed.

Various features of the present inventions are set forth in the following claims.

What is claimed is:

1. A brush for cleaning a grill or other surface, comprising:
a handle having a gripping end and a forward end;
a head portion extending from said forward end, said head portion having a front edge, two sides, a bottom surface and a top surface, wherein one said sides includes a first flange projecting below said bottom surface of said head portion and the other said side includes a second flange projecting below said bottom surface of said head portion, and each said first and second flange having at least one aperture; and
a bristle assembly formed from a continuous piece of twisted wire and twisted-in wire bristle material, the bristle assembly having a first stem end portion having a length of twisted wire and said length being parallel and adjacent to the first flange of the head portion, an intermediate portion having twisted-in wire bristles and being formed into at least two generally parallel rows of twisted-in wire bristles, and a second stem end portion having a length of twisted wire and said length being parallel and adjacent to the second flange of the head portion, wherein each said twisted wire stem end portion included at least one protrusion along each said length which is capable of removable engagement with said apertures on each of said flanges.

2. The invention of claim 1 wherein said intermediate portion of said bristle assembly includes three parallel rows of twisted-in-wire bristles between said first and second stem end portions.

3. The invention of claim 2 wherein said front edge of said head portion includes a scraper.

4. The invention of claim 1, wherein the intermediate portion of the bristle assembly includes at least one row of twisted-in wire bristles that is perpendicular to the length of said first and second stem end portions.

* * * * *